(12) United States Patent
Woodman et al.

(10) Patent No.: US 10,944,906 B2
(45) Date of Patent: *Mar. 9, 2021

(54) CAMERA BATTERY CONTROL METHOD FOR LOW AMBIENT TEMPERATURES

(71) Applicant: GoPro, Inc., San Mateo, CA (US)

(72) Inventors: Nicholas D. Woodman, Woodside, CA (US); Ihab A. Ali, Cupertino, CA (US); Todd Gotham, Los Altos, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,491

(22) Filed: Dec. 27, 2018

(65) Prior Publication Data

US 2019/0158742 A1 May 23, 2019

Related U.S. Application Data

(63) Continuation of application No. 15/457,958, filed on Mar. 13, 2017, now Pat. No. 10,200,610.

(60) Provisional application No. 62/396,761, filed on Sep. 19, 2016.

(51) Int. Cl.
*H04N 5/232* (2006.01)
*H04N 1/00* (2006.01)

(52) U.S. Cl.
CPC ..... *H04N 5/23241* (2013.01); *H04N 1/00896* (2013.01); *H04N 1/00986* (2013.01); *H04N 5/23245* (2013.01); *H04N 5/23293* (2013.01); *H04N 5/232939* (2018.08); *H04N 2201/0084* (2013.01)

(58) Field of Classification Search
CPC .......... H04N 5/23241; H04N 1/00986; H04N 1/00896; H04N 5/23245; H04N 5/23293; H04N 2201/0084
See application file for complete search history.

(56) References Cited

U.S. PATENT DOCUMENTS

| | | | |
|---|---|---|---|
| 6,628,337 B1 | 9/2003 | Yoshida | |
| 8,688,289 B2 | 4/2014 | Salsbery | |
| 9,116,677 B2 | 8/2015 | Jain | |
| 9,544,490 B2 | 1/2017 | Tomiyasu | |
| 9,596,396 B2 | 3/2017 | Yao | |
| 2003/0071913 A1* | 4/2003 | Yoshida | H04N 5/232 348/372 |
| 2008/0182156 A1 | 7/2008 | Atkinson | |
| 2011/0218694 A1* | 9/2011 | Moriya | H01M 10/42 700/300 |

(Continued)

*Primary Examiner* — Hung H Lam
(74) *Attorney, Agent, or Firm* — Young Basile Hanlon & MacFarlane, P.C.

(57) ABSTRACT

A camera system includes a lens assembly and image processing electronics internal to the camera housing and thermally coupled to the battery assembly. The battery assembly is sensitive to low ambient temperatures and may become damaged if the temperature of the assembly becomes sufficiently low. The camera system comprises a thermal management system that dissipates heat from electronic components of the camera to increase or maintain the temperature of the battery assembly. The thermal management configures the electronic components in different modes to create a step-wise increase of the resistive heat generated in the camera system and thereby increase the temperature of the components in the camera system.

20 Claims, 6 Drawing Sheets

(56) References Cited

U.S. PATENT DOCUMENTS

| | | |
|---|---|---|
| 2013/0037533 A1 | 2/2013 | Namekawa |
| 2013/0120630 A1* | 5/2013 | Kim .................. H04N 5/23241 |
| | | 348/333.01 |
| 2013/0193776 A1* | 8/2013 | Tanaka .............. H04W 52/0261 |
| | | 307/326 |
| 2014/0161358 A1* | 6/2014 | O'Haire ............... G06K 9/3216 |
| | | 382/199 |
| 2014/0321058 A1* | 10/2014 | Fujieda .................. G06F 1/203 |
| | | 361/700 |
| 2014/0371592 A1* | 12/2014 | Yamamoto ............... A61B 8/14 |
| | | 600/443 |
| 2015/0288871 A1* | 10/2015 | Saito .................. H04N 5/23222 |
| | | 348/353 |
| 2016/0066266 A1 | 3/2016 | Law |
| 2017/0102748 A1* | 4/2017 | Takahashi .......... H04N 1/00477 |
| 2018/0054558 A1* | 2/2018 | Nakata ..................... G03B 5/00 |

* cited by examiner

# CAMERA BATTERY CONTROL METHOD FOR LOW AMBIENT TEMPERATURES

CROSS REFERENCE TO RELATED APPLICATIONS

This application is a continuation of U.S. patent application Ser. No. 15/457,958 filed Mar. 13, 2017, which claims the benefit of U.S. Provisional Patent Application No. 62/396,761, filed on Sep. 19, 2016, both of which are incorporated in their entirety by this reference.

TECHNICAL FIELD

This description generally relates to a thermal management method and thermal management system for a camera in low temperature environments.

BACKGROUND

Digital cameras are becoming more pervasive in the field of activity focused photography. As their popularity increases, the cameras are being used in ever more extreme environments. At high temperatures, Lithium ion (Li-ion) batteries have reduced lifetimes and efficiency. Current cameras are designed with complex thermal management systems to reduce overheating of the battery and internal electronics via heat sinks and heat spreaders to improve camera performance.

Similarly, digital cameras with Li-ion batteries suffer reduced battery lifetimes in low temperature environments due to the Li-ion chemistries being less efficient. Unlike to high temperature design choices which strive to reduce camera temperatures, existing camera systems do not provide a mechanism for increasing battery temperature in low temperature environments to increase battery lifetimes.

BRIEF DESCRIPTION OF DRAWINGS

The disclosed embodiments have other advantages and features which will be more readily apparent from the following detailed description of the invention and the appended claims, when taken in conjunction with the accompanying drawings, in which:

Figures (FIGS.) 1A, 1B, 1C, and 1D are isometric views of a camera system with an automatic thermal control system, according to one example embodiment.

DETAILED DESCRIPTION

Figure 1A:
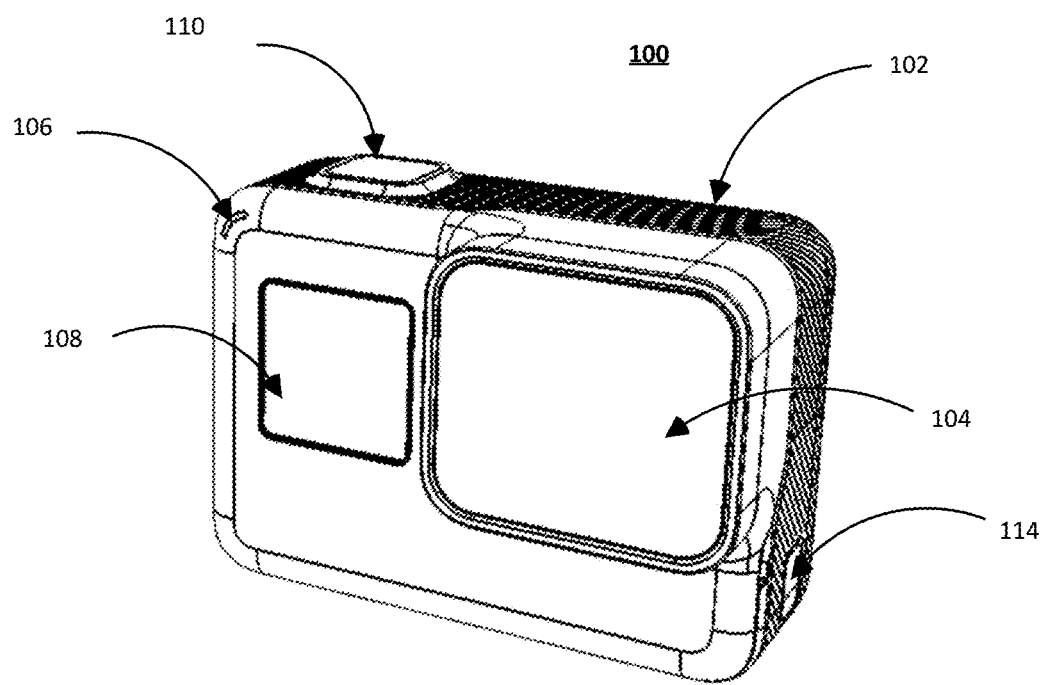
Figure 1B:
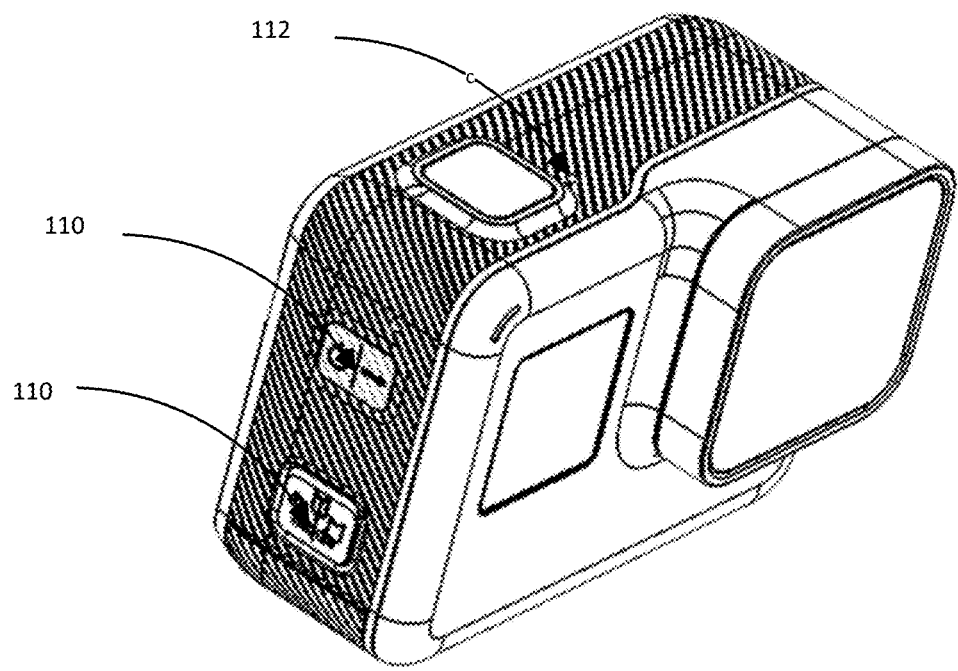
Figure 1C:
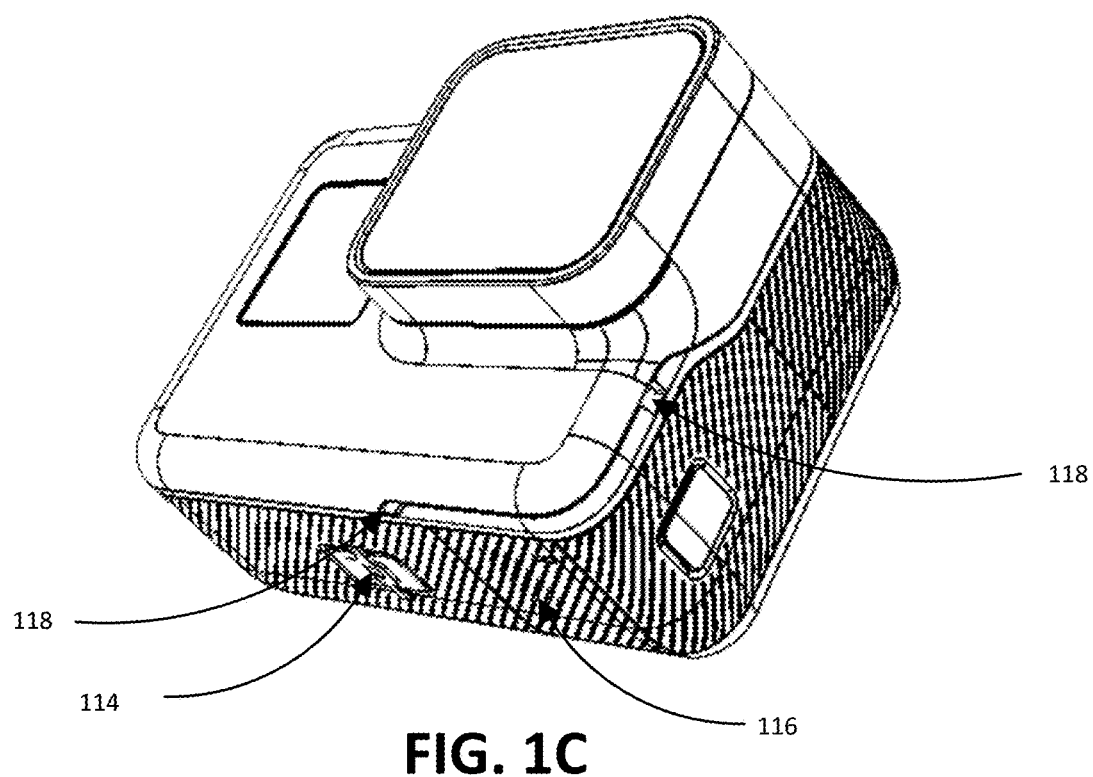
Figure 1D:
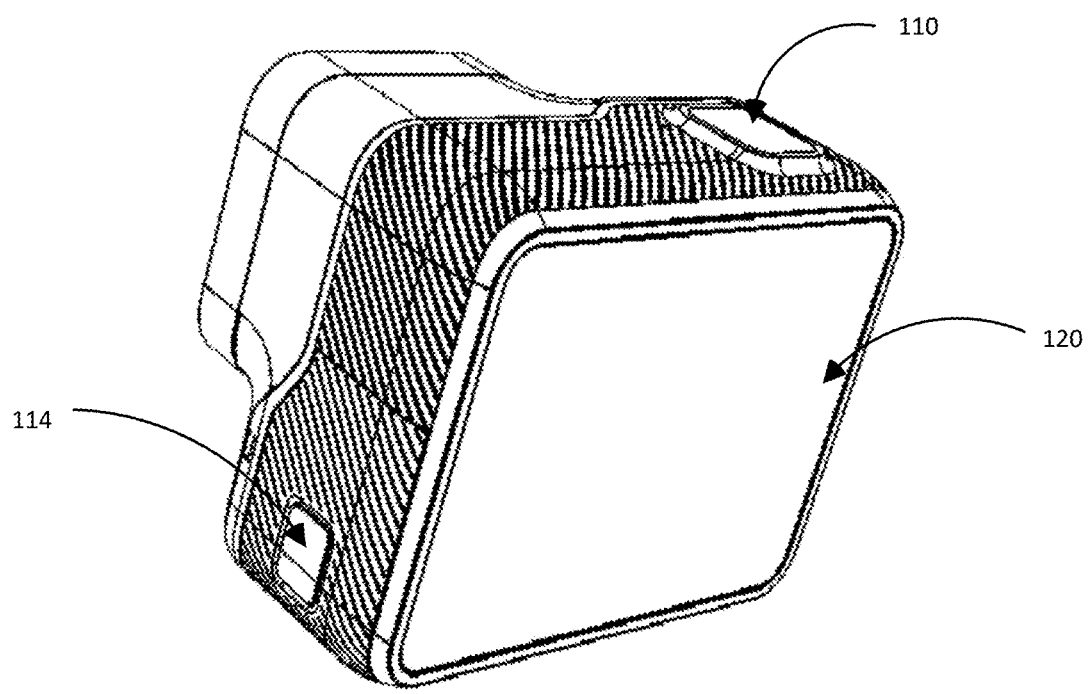

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A digital camera may have a camera body. The camera body may a camera lens structured on a front surface of the camera body. Internal to the camera body, an image sensor and electronics (e.g., imaging electronics, power electronics, etc.) is configured to capture images via the camera lens and/or performing other functions. The internals of the camera body also may include electronics for an external display device capable of displaying information about the camera system and a battery assembly to power various electronics for camera operation.

At low temperatures the battery assembly may operate less efficiently yielding reduced camera lifetimes due to Li-ion battery chemistries. Resistive heating of the image sensor electronics and external display device may create thermal energy which can be used to increase the battery temperature and its operation efficiency. Accordingly, in one example embodiment, the camera may include a thermal management system. The thermal management system may increase the temperature of the battery assembly by powering on various components of the camera system. The components may be configured to operate in different modes that modulate the amount of thermal energy dissipating into the camera system via resistive heating. For example, operating the image sensor at higher frame rates and pixel counts may produce more thermal energy than operating the image sensor at lower frame rates and pixel counts. Alternatively, operating the external image display in an active mode may produce more thermal energy than operating the external image display in a passive mode.

The camera may include a processor configured to control the thermal management systems of the camera. The processor can receive measurements of the remaining battery assembly fuel, the state of the external display device, the state of the image sensor assembly, and the temperature of the battery assembly. Subsequently, the processor may change the operative mode of the camera system to increase the temperature of the battery assembly. In a particular embodiment, a computer program product may be stored on a non-transitory computer readable storage medium within the camera. The computer program product may store instructions that when executed cause the processor to execute instructions for thermal management of the camera system.

Example Camera Configuration

Figures (FIGS.) 1A-1D illustrate an embodiment of an example camera 100 that may include a thermal control system for use in low temperature ambient environments. The camera 100 may comprise a camera body 102 having a camera lens 104 structured on a front surface of the camera body, various indicators on the front of the surface of the camera body 102 (such as LEDs, displays, and the like), various input mechanisms (such as buttons, switches, and touch-screen mechanisms), and electronics (e.g., imaging electronics, power electronics, etc.) internal to the camera body 102 for capturing images via the camera lens and/or performing other functions. The camera 100 may be configured to capture images and video, and to store captured images and video for subsequent display or playback.

The camera 100 can include various indicators, including the LED lights 106 and the LED display 108. The camera 100 can also include buttons 110 configured to allow a user of the camera to interact with the camera, to turn the camera on, and to otherwise configure the operating mode of the camera. The camera 100 can also include a microphone 112 configured to receive and record audio signals in conjunction with recording video. The side of the camera 100 may include an I/O interface 114. The camera may also include a loudspeaker (or speaker) 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the camera 100 may include a lens 104 configured to receive light incident upon the lens and to direct received light onto an image sensor internal to the lens.

The camera 100 includes a camera exterior that encompasses and protects the camera's internal electronics, which are further described in later sections. The camera exterior includes 6 surfaces (i.e. a front face, a left face, a right face, a back face, a top face, and a bottom face), wherein the exterior surfaces form a rectangular cuboid. Furthermore, both the front and rear surfaces of the camera 100 are substantially rectangular in shape. The camera 100 can be made of a rigid material such as plastic, aluminum, stainless steel, or fiberglass. Additional camera features, such as the features described above, may be affixed to an exterior of the camera. In some embodiments, the camera described herein includes features other than those described below. For example, instead of a single interface button, the camera can include additional buttons or different interface features, such as a multiple microphone openings to receive voice or other audio commands.

Example System Configuration

Figure 2:
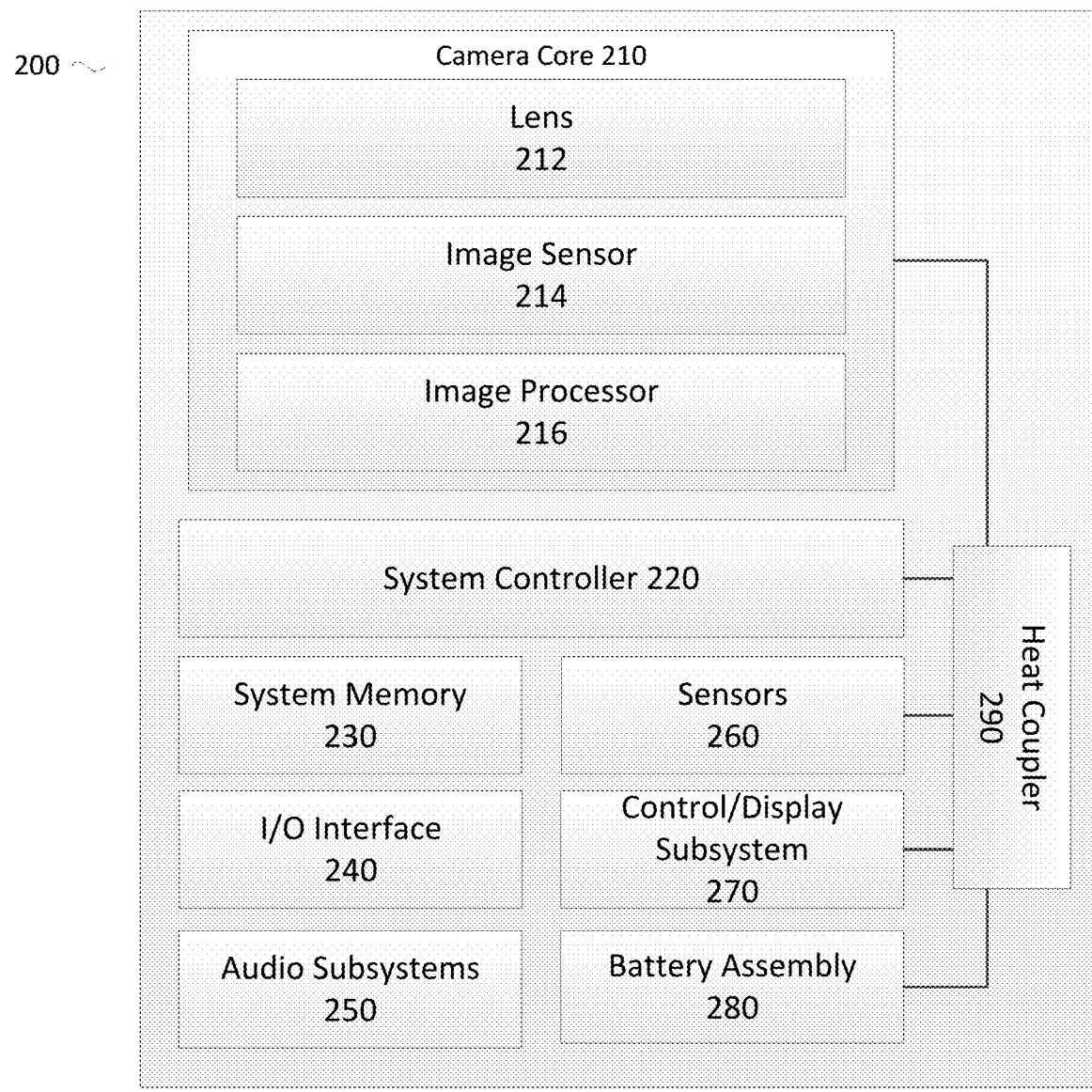
FIG. 2 illustrates a camera architecture, according to one example embodiment

FIG. 2 is a block diagram illustrating a system level example camera architecture 200 corresponding to the camera demonstrated in FIGS. 1A-1D. The camera architecture 200 may include a thermal management system for a camera battery. The thermal management system may be configured for operation in low ambient temperature environments. The camera architecture 200 may include a camera core 210, a system controller 220, a system memory 230, an I/O interface 240, an audio subsystem 250, sensors 260, a control/display subsystem 270, a battery assembly 280, and a heat coupler 290. The camera core may include a lens 212, an image sensor 214, and an image processor 214.

The components in FIG. 2 are grouped functionally and do not necessarily reflect a physical architecture of the camera architecture 200. For example, as described above, in one embodiment, the control/display subsystem 270 is embodied in a separate physical integrated circuit chip from the image processor 216. The integrated circuit chip including the image processor 216 also may include, for example, the image sensor 212, the system controller 220, system memory 230 and portions of the audio sub-system 250, I/O interface 240, and control/display sub-system 270.

In the example embodiment illustrated in FIG. 2, the camera architecture 200 has a camera core 210 that may include a lens 212, an image sensor 214, and an image processor 216. The camera architecture 200 additionally may include a system controller 220 (e.g., a microcontroller or microprocessor) that controls the operation and functionality of the camera architecture 200. The camera architecture 200 may include system memory 230 configured to store executable computer instructions that, when executed by the system controller 220 and/or the image processors 216, perform the camera functionalities described hereafter. In some example embodiments, a camera architecture 200 may include multiple camera cores 210 to capture fields of view in different directions which may then be stitched together to form a cohesive image. For example, in an embodiment of a spherical camera system, the camera architecture 200 may include two camera cores 210 each having a hemispherical or hyper hemispherical lens that each capture a hemispherical or hyper-hemispherical field of view which are stitched together in post-processing to form a spherical image. In other embodiments, multiple camera cores 210 may operate in separate cameras and be integrated via the I/O interface 240. For example, in an embodiment of a camera array system, the camera architecture may include at least two camera cores on at least two different cameras connected via the I/O interface 240 whose images are stitched together in post-processing to create a larger camera image.

The lens 212 can be, for example, a wide angle lens, hemispherical, or hyper hemispherical lens that focuses light entering the lens to the image sensor 214 which captures images and/or video frames. The image sensor 214 may capture high-definition video having a resolution of, for example, 480p, 720p, 1080p, 4k, or higher, or any other video resolution. For video, the image sensor 214 may capture video at frame rates of, for example, 30 frames per second, 60 frames per second, or higher, or any other possible frame rates. The image processor 216 performs one or more image processing functions of the captured images or video. For example, the image processor 216 may perform a Bayer transformation, de-mosaicing, noise reduction, image sharpening, image stabilization, rolling shutter artifact reduction, color space conversion, compression, or other in-camera processing functions. The image processor 216 may furthermore perform the timing metric calculations. The timing metric calculations may include determining frame rates, shutter speeds, exposure times, battery lifetimes, rate of change of battery lifetimes, time stamping of image, or similar. Processed images and video may be temporarily or persistently stored to system memory 230 and/or to a non-volatile storage, which may be in the form of internal storage or an external memory card. Additionally, the image processor may be configured to capture video or images and not store them in the system memory 230.

An input/output (I/O) interface 240 may transmit and receive data from various external devices. For example, the I/O interface 240 may facilitate the receiving or transmitting video or audio information through an I/O port. Examples of I/O ports or interfaces include USB ports, HDMI ports, Ethernet ports, audio ports, and the like. Furthermore, embodiments of the I/O interface 240 may include wireless ports that can accommodate wireless connections. Examples of wireless ports include Bluetooth, Wireless USB, Near Field Communication (NFC), and the like. The I/O interface 240 may also include an interface to synchronize the camera architecture 200 with other cameras or with other external devices, such as a remote control, a second camera, a smartphone, a client device, or a video server.

Sensors 260 may capture various metadata concurrently with, or separately from, video capture. For example, the sensors 260 may capture time-stamped location information based on a global positioning system (GPS) sensor, and/or an altimeter. Other sensors 260 may be used to detect and capture orientation of the camera architecture 200 including, for example, an orientation sensor, an accelerometer, a gyroscope, or a magnetometer. Additional sensors may be used to detect and capture information about the camera system such as internal or external temperature of camera components such as the camera core, the system controller or the battery assembly. The sensors may additionally detect the presence of liquids within or external to the camera body or the proximity of liquids to camera components. The sensors may also be configured to monitor the integrity of camera components such as microphones, speakers, membranes, lenses, or any other component of the camera coupled to a sensor. The sensors may also comprise components capable of monitoring position, pressure, time, velocity, acceleration or similar.

Sensor data captured from the various sensors 260 may be processed to generate other types of metadata. For example, sensor data from the accelerometer may be used to generate motion metadata, comprising velocity and/or acceleration vectors representative of motion of the camera architecture 200. Sensor data from a GPS sensor can provide GPS coordinates identifying the location of the camera architecture 200, and the altimeter can measure the altitude of the camera architecture 200. In one embodiment, the sensors 260 are rigidly coupled to the camera architecture 200 such that any motion, orientation or change in location experienced by the camera architecture 200 is also experienced by the sensors 260. The sensors 260 furthermore may associate a time stamp representing when the data was captured by each sensor. In one embodiment, the sensors 260 automatically begin collecting sensor metadata when the camera architecture 200 begins recording a video. In still other embodiments the sensors may be external to the camera body and transmit the sensor data or sensor metadata to the camera via the I/O interface 240.

A control/display subsystem 270 includes various control and display components associated with operation of the camera architecture 200 including, for example, LED lights, a display, buttons, microphones, speakers, and the like. The audio subsystem 250 includes, for example, one or more microphones and one or more audio processors to capture and process audio data correlated with video capture. In one embodiment, the audio subsystem 250 includes a microphone array having two or more microphones arranged to obtain directional audio signals.

The battery assembly 280 may include power cells for powering various components of the camera system. For example the power cells may be a Lithium-Ion battery, a Nickel-Cadmium battery, a Nickel-metal-Hydride battery, a Lithium-Polymer battery, a Lead-Acid battery, a solar-cell, a power cord to an external power source, a kinetic power generation system, or any other component used to power an electrical system. The battery assembly may be configured to be controlled by the system controller 220, with the system controller dictating which components of the camera sub-systems and components will receive power during operation. The battery assembly 280 may be controlled by various input mechanisms (such as buttons, switches, and touch-screen mechanisms) on the external body of the camera or by directions received via the I/O interface 160. Additionally, the battery assembly 280 may be removable from the camera system to allow for recharging the power cells of the battery assembly or replacing the current battery assembly 280 with a different battery assembly 280.

Components of the camera system may be thermally coupled by a heat coupler 290. The heat coupler may be any component that may transfer thermal energy from one sub-system of the camera to another sub-system of the camera. For example the heat coupler 290 may be a heat pipe, a heat spreader, a heat exchanger, a convective fan, thermally conductive wire, or similar. Furthermore, the heat coupler may not be a component of the camera 100 or camera architecture 200 and may represent a physical process for heat transfer between systems such as thermal convection, thermal conduction, or thermal radiation caused by proximity between separate subsystems or design of components within the camera system. The system controller may be configured to control thermal transfer between subsystems using the heat coupler.

Determining Thermal Characteristics of Components

During use in adverse environments, such as very low temperatures, determination of the temperature of a camera system and components comprising the camera system may aid in increasing the run time of the camera system. Furthermore, determining the rate of change of the camera system temperature and components of the camera system may further aid in increasing the run time of the camera system. For example, in adverse environment of −20° (negative twenty degrees) Celsius (C) or less, keeping internal battery temperature above these levels may help prevent battery loss of life. One skilled in the art will note that an adverse environment of −20° C. is given in example; the actual temperature for internal battery degradation may be any temperature in which the battery cells suffer adverse effects due to temperature.

The camera may determine the temperature of any component of the camera system via direct measurement via a sensor component 260. The sensor may be coupled to any component of the camera 100 such that direct measurement of the temperature by the sensor yields an accurate measurement of the component temperature. In other embodiments the sensor may be coupled to the component such that the direct measurement of the temperature may be inaccurate and the camera may access the system controller 220 or system memory 230 to determine an accurate temperature measurement. In this embodiment, the system controller may access a look up table to determine the accurate temperature measurement.

For example, the sensor 260 may be a thermocouple configured to measure the temperature of the battery assembly 280 while the temperature of the camera assembly is from 0° C. to 25° C. and the thermocouple is dry. A separate sensor 260 senses that the thermocouple is wet and sends a signal to the system controller 220 indicating the status of the thermocouple. The system controller 220 accesses a look up table in the system memory 230 with adjusted lens temperatures for instances where the thermocouple is wet and adjusts the measured temperature measured by the sensor 260.

While the above example discusses a thermocouple sensing the temperature of the battery assembly 280 in a wet environment, it will be obvious to one skilled in the art that look up tables can be used to adjust any sensor 260 reading in any component of the camera 100 in any situation the camera system might operate in. This may include, temperature measurements near the edges of thermometer operating ranges, moisture measurements affected by varied pressures, pressure measurements affected by varied temperatures, pressure measurements affected by varied moistures, temperature measurements of nearby components to indicate the temperature of nearby non-sensed components, temperature measurements outside the operating ranges of the sensor, or similar.

Figure 3:
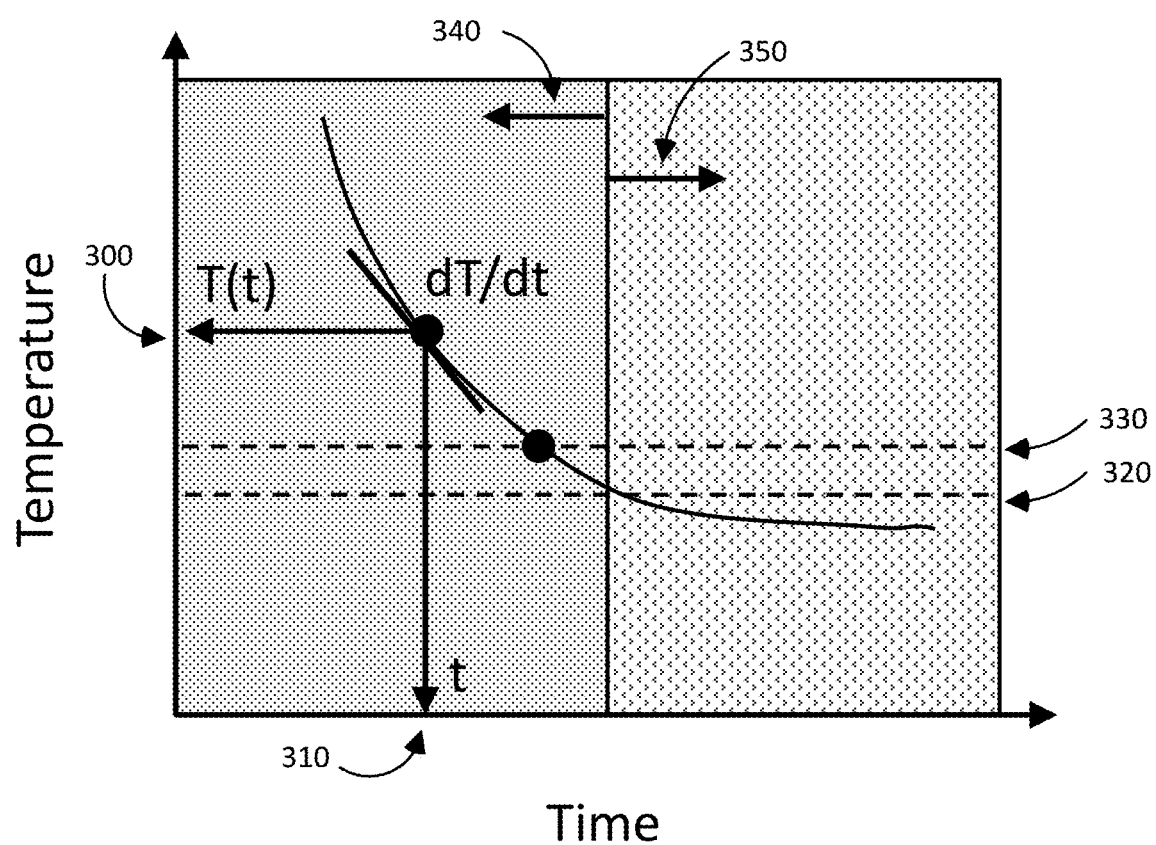
FIG. 3 illustrates the calculation of the thermal gradient of a camera system, according to one example embodiment.

The camera system may be configured to measure the rate of change of the temperature of camera components. FIG. 3 illustrates an example of the calculation of a thermal gradient $\nabla_T$ of a camera component. The camera may be configured to measure both temperature 300 and time 310 via sensors integrated into the camera system. The camera system can measure a first temperature $T_1$ at a first time $t_1$ and can subsequently measure a second temperature $T_2$ at a second time $t_2$ via the sensors and system controller. The thermal gradient may be calculated by the system controller and sensors as $\nabla_T = (T_2 - T_1)/(t_2 - t_1)$. As discussed previously, the sensed temperatures and times may be adjusted via accessing a look up table in the system memory 230. For example, the camera may sense a first temperature of the battery assembly of 15° C. at 3:00 pm and may sense a second temperature of the battery system of 10° C. at 3:01 pm and the system controller calculates the thermal gradient of −5° C. per minute.

The camera system may be configured to calculate various other thermal characteristics using the thermal gradient. The system controller may calculate: the projected lifetime of the battery assembly based on the thermal characteristics of the system, the time required for the temperature of a camera component to reach a threshold temperature, the projected temperature of a camera component after an elapsed period of time, or any other time and temperature metric. Using the example above, with the thermal gradient of −5° C. per minute the system controller may calculate that the amount of time to reach a temperature of 0° C. is 2 minutes. Additionally, the system controller may calculate that the temperature of the camera system will be −15° C. at 3:06 pm. In some embodiments, a condition for the camera to access a look up table may exist and the system controller may adjust the thermal gradient to −2° C. per minute and make temperature dependent calculations accordingly.

Inherent Thermal Limitations of the Camera System

The camera system may be configured such that there are thermal limitations on various components of the camera system. These limitations may include: minimum and maximum working temperatures of camera components, minimum and maximum temperature gradients of camera components, maximum thermal dissipation of camera components, minimum and maximum lifetimes of camera components that are temperature dependent, and any other physical or electrical limitation of the camera system that is temperature dependent.

Continuing with FIG. 3, it also illustrates thermal limitations that may exist for the camera system. They axis is the temperature of the battery assembly and the x axis is the progression of time of the camera system. For example, the illustrated camera system may have a minimum working temperature of the battery assembly. The camera system may cease operation or be severely damaged if the temperature of the battery assembly goes below a lower temperature threshold, e.g., the non-recoverable point 320. Before the temperature of the camera reaches the non-recoverable point, the camera may be configured such that there is a recovery threshold temperature, e.g., a recoverable point 330, at which the camera may be configured to begin thermal control of the system. This thermal control keeps the camera within a recoverable range of temperatures 340 and prevents the camera from reaching a range of non-recoverable temperatures 350.

Thermal Stepping Process

The camera system may be configured such that the thermal control keeping the camera within a recoverable range of temperatures is a temperature stepping process in which the system controller configures components of the camera system to dissipate more energy into camera components via the heat coupler 290 to increase the resistive heat entering the camera system. For example, the system controller 220 may power on various electronic components of the system including the input/output electronics, the display device, the audio subsystems, the image processor, the camera core, the system memory or any other electronic component of the system that can dissipate electric energy as heat.

In the illustrated system, the system controller may also configure the electronic components to run in modes that dissipate more heat than other modes. For example, the system controller 220 may configure the camera core 210 to capture images at 30 frames per second (fps), 60 fps, or 120 fps, all of each mode dissipating a specific amount of heat into the camera system via the heat coupler 290. The camera core may be further configured to capture images at pixel resolutions of, for example, 480p, 720p, 1080p or 4K. Each resolution mode may dissipate a specific amount of heat into the camera system via the heat coupler 290. Generally, higher quality image capture modes produce more heat in the camera system, e.g., 4k produces more heat than 480p and 120 fps produces more heat than 30 fps. In one embodiment the camera core 210 may be configured to capture images and not store them into the system memory 230 such that the camera system dissipates heat into the system without reducing the amount of free storage space in the system memory.

Each of these modes, or a combination of these modes, may be considered a 'step,' with the system controller configuring the camera core to the modes associated with a 'step' to generate heat in the camera system via the heat coupler 290. The system controller 220 may configure the camera system to different 'steps' based on the thermal characteristics of the camera system and the camera components.

Figure 4:
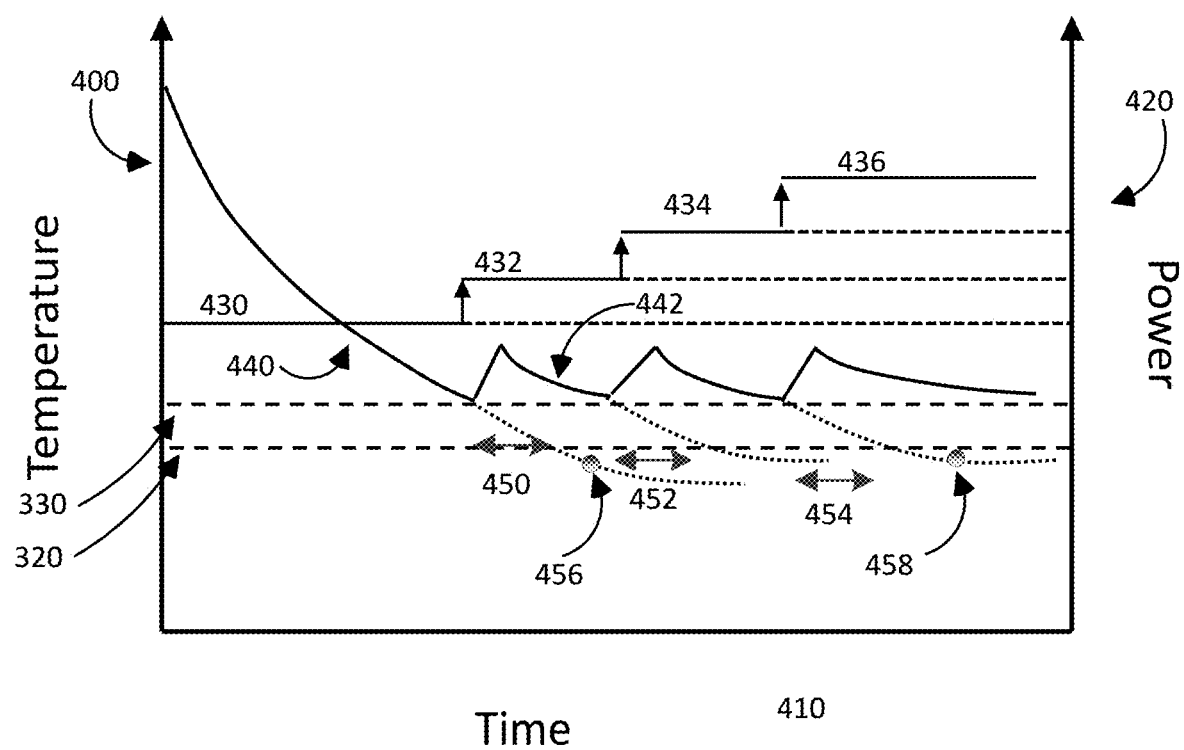
FIG. 4 illustrates the thermal management process of a camera system, i.e. power heating stepping, according to one example embodiment.

Turning now to FIG. 4, it illustrates an example of the system controller using a thermal stepping process to maintain the battery assembly 280 temperature in the recoverable range above the non-recoverable point. The temperature of the battery assembly 400 is the left axis, time 410 is the bottom axis, and dissipated power into the camera system and battery assembly 420 is the right axis. During idle operation, the camera system may dissipate a first amount of power 430 that heats the camera system and battery assembly and camera system decreases in temperature towards the non-recoverable point 320 as the heat produced is not sufficient to prevent the camera from over-cooling. At the recoverable point 330, the temperature and the thermal gradient of the battery assembly is measured via the system controller 220 and sensors 260. The system controller may also calculate the amount of time 450 for the temperature of the battery assembly to reach the non-recoverable point. The system controller 220 may power on components of the camera system and configure them such that they dissipate a first amount of heat 432 into the camera system and battery assembly, e.g., a first step. Due to the adverse ambient conditions (e.g., lowering temperatures), the camera system may continue to decrease in temperature 442 despite the additional heat being dissipated into the camera system. Once again, the temperature of the camera and battery assembly may reach a recoverable point 330 and the system controller may power on components of the camera system architecture and configure them, or reconfigure already powered on components, such that they dissipate a second amount of heat into the camera system 432 and battery assembly, i.e., a second step. The camera system may be configured to use a plurality of steps, e.g. 434 and 436, to maintain the temperature of the battery assembly within the range of recoverable temperatures. The camera system may also be configured to determine the amount of time for the temperature of the battery assembly to reach a threshold temperature at any point 452 and 454. The camera system may be further configured to predict the temperature of the camera system at a given time 456 and 458.

In the illustrated example, the first step may power on the interactive display and produce 1.19 W of thermal energy into the camera system. The second step may power on the camera core and configure the core to record in 720p at 30 fps to dissipate 1.54 W of thermal energy into the camera system. The third step may reconfigure the camera core to record in 1080p at 60 fps to dissipate 2.36 W of thermal energy into the camera system. The fourth step may reconfigure the camera core to record in 4K at 30 fps to dissipate 2.7 W of thermal energy into the camera system. The actual thermal energy dissipated into each step are generally listed as examples, and one skilled in the art will recognize that each step increases the thermal energy dissipated into the system.

The camera system may also be configured with a variety of exit conditions for the thermal management process. In one example embodiment the thermal management process may be controlled by an input to the camera system from a user via a button, an interactive display, input/output hardware, or any other device capable of changing the configuration of the camera. In other embodiments, the thermal control process may be terminated by the system controller when certain conditions within the camera are met such as a minimum operating temperature, a minimum power reserve, a maximum operating temperature, or any other condition set by the system controller.

Thermal Control Process

Figure 5:
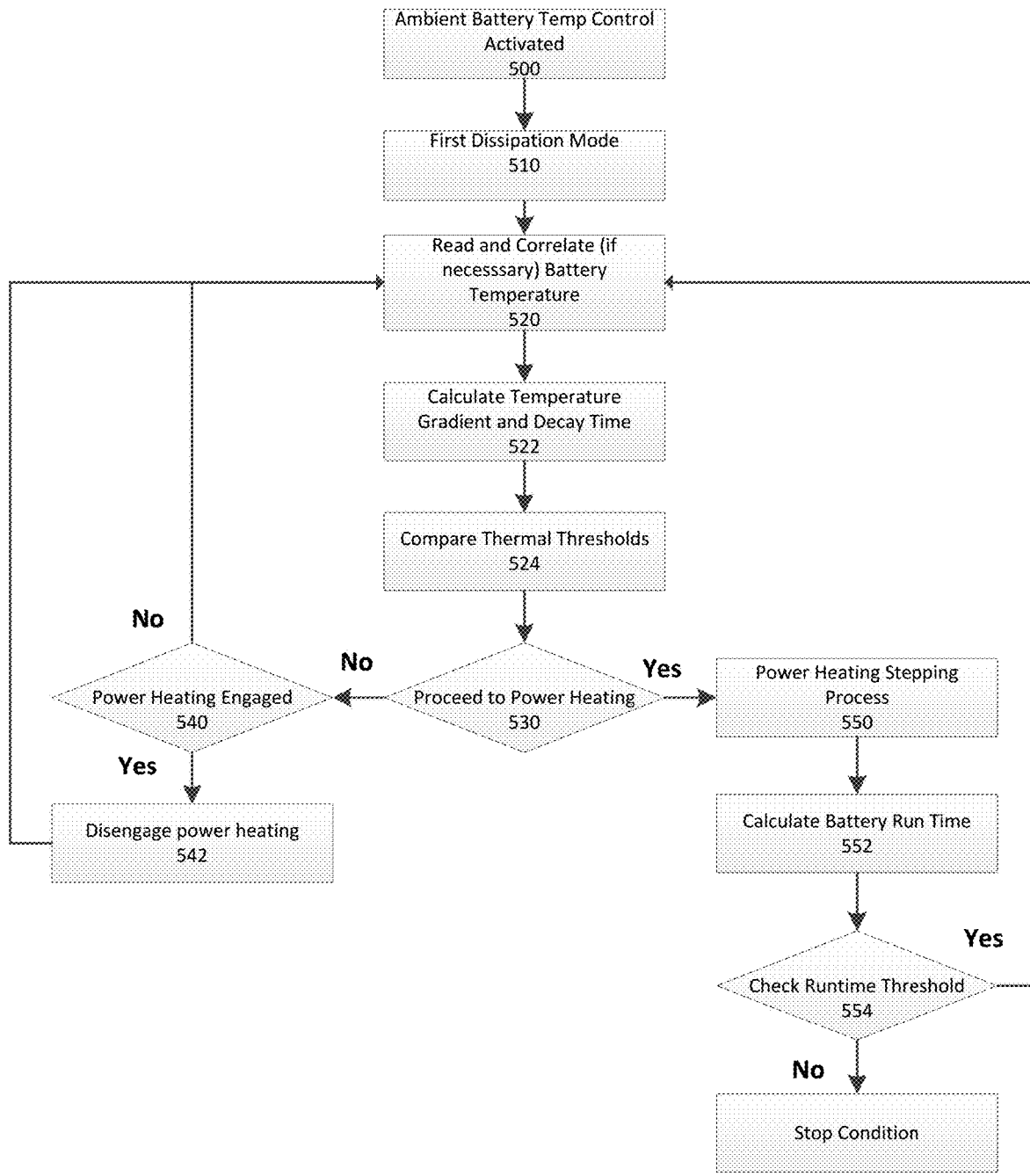
FIG. 5 illustrates a method for thermal management of a camera system using controlled operation of onboard electronic components, according to one example embodiment.

Using the configuration of modes to dissipate heat into the camera system, the system controller may be configured to institute a thermal control process to raise the temperature of the camera system and battery assembly by using the camera core to raise the temperature of camera components. FIG. 5 illustrates an example thermal control process flow of the system controller. To begin, the thermal management system is engaged, e.g., by activating 500 the ambient battery temperature control. The initial engagement of the thermal management system may be from a user interacting with the device and changing its configuration, the sensors in the camera sensing harsh environments (e.g. low temperatures), an external device connecting to the system to change its configuration via the input/output hardware, or similar.

In some embodiments, engaging the thermal management system causes the system controller to automatically enter 510 the 'first step,' e.g., a first dissipation mode, of energy dissipation to begin warming the camera system and battery assembly. In the example configuration, the 'first step' causes the system controller to configure the camera system such that the interactive display device is powered on. In other embodiments, the camera system the first dissipation mode may be entered via the thermal stepping process.

The camera system can measure the camera system and battery assembly via sensors in the camera system and battery assembly. For example the system may read (or sense) 520 temperature measurements and, if necessary, correlate the battery temperature with look up tables and/or other stored reference data in system memory (or storage). For correlation, the system may adjust the read temperature measurements via the lookup tables in the system memory.

The system controller calculates 522 the thermal gradient and the projected time for the system to reach the non-recoverable zone, e.g. a decay time.

The system controller may calculate and compare 524 the gradients, the measured temperatures, and times to thermal thresholds or time thresholds. The system controller determines if the camera system is still within the thermal thresholds of using the power heating process, e.g., is the camera system above the temperature threshold (e.g., the recoverable point) or will the camera system soon reach the temperature threshold (e.g., the thermal gradient is high and the time to reach the recoverable point is below a threshold time).

Using the calculations from the comparison 524, the system controller determines 530 whether to proceed to power heating configurations. If the camera system is above the recoverable point and the time to reach the recoverable point is below a threshold time, the camera does not proceed to power heating. The system controller determines 540 whether or not power heating mode is already engaged. If the power heating mode is already engaged, the camera system temperature is above the recoverable point and the time to reach the recoverable point is above a threshold time, the heating mode is disengaged 542, and the camera again reads 520 the thermal conditions of the camera system and battery assembly. If the power heating mode is already disengaged, the camera system temperature is above the recoverable point and the time to reach the recoverable point is above a threshold time, the power heating remains disengaged and the camera again reads 520 the thermal conditions of the camera system and battery assembly.

If the camera system is at the recoverable point or will soon reach the recoverable point, the camera enters 550 power heating mode and the power stepping process. If the time projected to reach the non-recoverable point is below a threshold time, or the temperature of the camera is below the recoverable point, the system controller may configure the camera core to the step that dissipates the most heat. If the camera system is still at or above the recoverable point and the projected time to reach the non-recoverable point is above a threshold time, the power stepping process increments the power heating to the next highest step of power dissipation as discussed in 'Thermal Stepping Process.'

The system controller calculates 552 the amount of time remaining in the battery with the current configuration of the camera core and camera system. The system determines 554 if the projected camera runtime is below a certain threshold the camera disengages power heating mode and powers off the camera due to insufficient battery life. If the projected camera runtime is above the threshold, the process flow returns to reading the camera system and battery temperature 520.

Benefits and Advantages

In the described embodiments, and similar embodiments, the thermal management system allows the digital camera system to operate in low temperature environments that generally have negative impacts on the camera system by preventing the battery assembly from entering non-recoverable temperature ranges. Additionally, using the resistive heating of the camera components thermally coupled to the battery assembly improves the battery lifespan as the battery assembly is more efficient when not operating near the non-recoverable temperature ranges. The temperature stepping process allows the camera system to increase camera lifetimes and battery health by generating and dissipating only the necessary amount of thermal energy to maintain camera operation.

Note that the described system is unique in that common thermal management systems in electronic devices such as a camera system operate in a reciprocal manner, e.g. if the electronic system begins to overheat the system controller turns off or intentionally decreases performance of electronic components of the system to prolong battery life. Additionally, thermal thresholds in the systems are generally set as an upper limit rather than a lower limit, e.g. the electronic device will turn off if the device becomes too hot.

Additional Configuration Modes

The thermal stepping process may include, but are not limited to, the following configurations of the camera system: 240p at 24 fps; 360p at 24 fps; 480p at 24 fps; 720p at 24 fps; 1080p at 24 fps; 4K at 24 fps; 240p at 25 fps; 360p at 25 fps; 480p at 25 fps; 720p at 25 fps; 1080p at 25 fps; 4K at 25 fps; 240p at 30 fps; 360p at 30 fps; 480p at 30 fps; 720p at 30 fps; 1080p at 30 fps; 4K at 30 fps; 240p at 60 fps; 360p at 60 fps; 480p at 60 fps; 720p at 60 fps; 1080p at 60 fps; 4K at 60 fps, and similar.

The thermal stepping process may also include configuring other components of the camera system to produce thermal energy in the system. The other components may also be thermally coupled to the battery assembly such that the dissipated electrical energy of the component is translated to the battery assembly. The components that may be configured to produce thermal energy for the camera system may include: sensors; input/output devices such as Bluetooth or wireless antennas and receivers; audio subsystem components including microphones, speakers, or audio subsystem sub-controllers.

It will be noted by one skilled in the art that any similar camera system configured to capture images and videos at varying frame rates may be integrated into any electronic device to assist in thermal management of the electronic device in low temperature environments. The previously described external display system may be on an external surface of the electronic device rather than an external surface of the camera. The previously described battery assembly may be internal to the electronic device rather than internal to the camera system. The previously described image sensor assembly may be internal to the electronic device rather than internal to the camera system. A controlling component of the electronic device may be used to configure the camera system, calculate gradients, determine thresholds, or any other processes described as accomplished by the camera system controller. Additionally, the image sensor assembly may be coupled to any component of the electronic device to assist in the thermal management of the coupled device. The electronic device may be a computer, a personal computer, a cell phone, a drone, a tablet computer, or any other similar electronic device.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a heat spreader as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera system comprising:
   a camera body;
   a battery assembly internal to the camera body;
   an image sensor assembly coupled to the battery assembly and internal to the camera body; and
   a processor, wherein the processor, is configured to execute instructions to:
      determine a first temperature and a second temperature of the battery assembly;
      determine an expected temperature of the battery assembly based on the first temperature and the second temperature;
      compare the expected temperature to a predefined threshold; and
      responsive to the expected temperature being below the predefined threshold, change the image sensor assembly from a first capture mode to a second capture mode, the second capture mode having a higher thermal energy dissipation than the first capture mode.

2. The camera system of claim 1, further comprising:
   a display assembly structured on a surface of the camera body, wherein the display assembly comprises a heat pipe to divert thermal energy into the camera system.

3. The camera system of claim 2, wherein the processor, is configured to execute instructions to:
   responsive to the expected temperature being below the predefined threshold, change the display assembly from a first display mode to a second display mode.

4. The camera system of claim 3, wherein the first display mode is an off state.

5. The camera system of claim 1, wherein the first capture mode is an off state.

6. The camera system of claim 5, wherein the second capture mode is a first on state.

7. The camera system of claim 6, wherein the image sensor assembly includes a third capture mode that is a second on state, the second on state dissipating more thermal energy than the first capture mode and dissipating less thermal energy than the second capture mode.

8. The camera system of claim 7, wherein the third capture mode captures images at fewer frames per second than the second capture mode.

9. The camera system of claim 8, wherein the second display mode is another on state.

10. An electronic device comprising:
a battery;
an image sensor; and
a processor, wherein the processor, is configured to execute instructions to:
determine one or more temperatures of the battery;
determine an expected temperature of the battery based on the one or more temperatures of the battery;
compare the expected temperature to a predefined threshold; and
responsive to the expected temperature being below the predefined threshold, change the image sensor from a first capture mode to a second capture mode, the second capture mode having a higher thermal energy dissipation than the first capture mode.

11. The electronic device of claim 10, further comprising:
a display, wherein the display includes a heat pipe to divert thermal energy.

12. The electronic device of claim 11, further comprising:
a device body, wherein the battery and the image sensor are internal to the device body, further wherein the display is structured on a surface of the device body.

13. The electronic device of claim 12, is configured to execute instructions to:
change the display from a first display mode to a second display mode.

14. The electronic device of claim 10, wherein the first capture mode is an off state.

15. The electronic device of claim 14, wherein the second capture mode is a first on state.

16. The electronic device of claim 15, wherein the image sensor includes a third capture mode that is a second on state, the second on state dissipating more thermal energy than the first capture mode and dissipating less thermal energy than the second capture mode.

17. The electronic device of claim 16, wherein the third capture mode captures images at fewer frames per second than the second capture mode.

18. The electronic device of claim 13, wherein the first display mode is an off state.

19. The electronic device of claim 13, wherein the second display mode is another on state.

20. A method comprising:
measuring a first temperature of a battery of an electronic device;
measuring a second temperature of the battery;
determining an expected temperature of the battery based on the first temperature and the second temperature;
determining a relationship between the expected temperature and a predefined threshold; and
responsive to the expected temperature being below the predefined threshold, changing a sensor of the electronic device from a first state to a second state, the second state having a higher thermal energy dissipation than the first state.

* * * * *